United States Patent
Kirita et al.

(10) Patent No.: US 8,081,389 B2
(45) Date of Patent: Dec. 20, 2011

(54) ELECTRO-WETTING DEVICE AND A METHOD OF MANUFACTURING THE SAME

(75) Inventors: Shina Kirita, Tokyo (JP); Toshitaka Kawashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 142 days.

(21) Appl. No.: 12/526,912

(22) PCT Filed: Feb. 4, 2008

(86) PCT No.: PCT/JP2008/051774
§ 371 (c)(1),
(2), (4) Date: Aug. 12, 2009

(87) PCT Pub. No.: WO2008/099702
PCT Pub. Date: Aug. 21, 2008

(65) Prior Publication Data
US 2010/0046084 A1 Feb. 25, 2010

(30) Foreign Application Priority Data
Feb. 13, 2007 (JP) .................................. 2007-031442

(51) Int. Cl.
*G02B 1/06* (2006.01)
(52) U.S. Cl. ........................................................ 359/665
(58) Field of Classification Search .................. 359/665, 359/666
See application file for complete search history.

(56) References Cited

U.S. PATENT DOCUMENTS

| | | | |
|---|---|---|---|
| 4,737,684 A | 4/1988 | Seto et al. | |
| 6,030,381 A * | 2/2000 | Jones et al. | 606/41 |
| 6,369,954 B1 | 4/2002 | Berge et al. | |
| 7,221,514 B2 * | 5/2007 | Venema | 359/619 |
| 7,440,075 B2 * | 10/2008 | Hendriks et al. | 349/193 |
| 2005/0002113 A1 | 1/2005 | Berge | |
| 2005/0104102 A1 | 5/2005 | Fukuzumi | |

(Continued)

FOREIGN PATENT DOCUMENTS

JP 61-198592 9/1986

(Continued)

OTHER PUBLICATIONS

International Search Report dated Apr. 18, 2008, for corresponding Patent Application PCT/JP2008/051774.

*Primary Examiner* — Jordan Schwartz
(74) *Attorney, Agent, or Firm* — K&L Gates LLP

(57) ABSTRACT

An electro-wetting device is provided that can prevent deterioration of withstand voltage characteristics due to use of a high-dielectric constant film, thereby ensuring an insulating structure having high reliability. The electro-wetting device includes a conductive first liquid, an insulating second liquid, a transparent substrate and a cover body defining a liquid room for accommodating therein the first and second liquids, an electrode layer formed on a surface, on the liquid room side, of the transparent substrate, and an insulating layer formed on a surface of the electrode layer. The insulating layer has a lamination structure of a first insulating film made of an insulating inorganic crystalline material, and a second insulating film made of an insulating inorganic amorphous material, which results in that surface irregularities of the first insulating film is relaxed by the second insulating film, and thus the low voltage drive is possible. As a result, it is possible to obtain the highly reliable insulating layer which is excellent in the withstand voltage strength.

4 Claims, 6 Drawing Sheets

U.S. PATENT DOCUMENTS

| | | |
|---|---|---|
| 2005/0184627 A1 | 8/2005 | Sano et al. |
| 2007/0103790 A1 | 5/2007 | Berge |
| 2009/0231670 A1* | 9/2009 | Bower et al. ............ 359/290 |
| 2009/0263641 A1* | 10/2009 | Martin et al. ............ 428/221 |

FOREIGN PATENT DOCUMENTS

| | | |
|---|---|---|
| JP | 05-114482 | 5/1993 |
| JP | 11-185969 | 7/1999 |
| JP | 11-330391 | 11/1999 |
| JP | 2000-347005 | 12/2000 |
| JP | 2001-519539 | 10/2001 |
| JP | 2003-302502 | 10/2003 |
| JP | 2005-109702 | 4/2005 |
| JP | 2005-150457 | 6/2005 |
| JP | 2005-244184 | 9/2005 |
| JP | 2006-194598 | 7/2006 |
| JP | 2007-17668 | 1/2007 |

* cited by examiner

ELECTRO-WETTING DEVICE AND A METHOD OF MANUFACTURING THE SAME

CROSS REFERENCE TO RELATED APPLICATIONS

The present application is a National Stage of International Application No. PCT/JP2008/051774 filed on Feb. 4, 2008 and which claims priority to Japanese Patent Application No. 2007-031442 filed on Feb. 13, 2007, the entire contents of which are being incorporated herein by reference.

BACKGROUND

The present disclosure relates to an electro-wetting device utilizing an electro-wetting effect (electro-capillary phenomenon), and a method of manufacturing the same.

In recent years, a development of an electro-wetting device utilizing an electro-wetting effect has been advanced (for example, refer to a pamphlet of PCT Patent Publication No. WO 99/18456). The electro-wetting effect means a phenomenon that when a voltage is applied across a liquid having a conductivity and an electrode, an energy of a solid-liquid interface between the electrode surface and the liquid changes, and thus a shape of the liquid surface changes.

In general, the electro-wetting device includes a conductive first liquid, an insulating second liquid, a pair of base materials (a lower substrate, and an upper substrate) defining a liquid room for accommodating therein the first and second liquids, an electrode layer formed on a surface of the lower substrate, and an insulating layer formed on a surface of the electrode layer (for example, refer to Japanese Patent Laid-Open No. 2003-302502). A voltage is applied across the conductive first liquid and the electrode layer between which the insulating layer is sandwiched, which results in that a shape of an interface between the first and second liquids changes due to an electro-wetting effect. Thus, refractive indices of the first and second liquids are made different from each other, whereby it is possible to structure a variable focusing lens in which a shape of an interface between the two liquids reversibly changes in accordance with a magnitude of the applied voltage.

In recent years, the development of the electro-wetting device, having high reliability, which is driven with a low drive voltage is required. As described above, the electro-wetting device is driven in accordance with the magnitude of the voltage applied across the conductive liquid and the electrode layer. The drive voltage is proportional to a dielectric constant of the insulating layer interposed between the conductive liquid and the electrode layer, and is inversely proportional to a thickness of the insulating layer. Therefore, a high-dielectric constant material is formed as the insulating layer to have a small thickness, thereby making it possible to reduce the drive voltage for the electro-wetting device. Here, a sputtered film or the like made of an insulating inorganic crystalline material such as a metal oxide is known as an insulating material having a high dielectric constant.

However, since irregularities of a film surface after film deposition are relatively large in this sort of inorganic material, this sort of inorganic material involves a problem that the uniformity of a film thickness is poor, and thus it is difficult to obtain the stable withstand voltage characteristics. That is to say, the possibility that current leakage occurs between a local area having peak irregularities of the high-dielectric constant film formed, and a conductive liquid, and thus dielectric breakdown of an insulating layer occurs becomes high.

Therefore, it is desired to provide an electro-wetting device which is capable of ensuring a highly reliable insulating structure by preventing withstand voltage characteristics from being deteriorated due to use of a high-dielectric constant film, and a method of manufacturing the same.

SUMMARY

In order to solve the problem described above, according to an embodiment, there is provided an electro-wetting device including: a conductive first liquid; an insulating second liquid; a pair of base materials defining a liquid room for accommodating therein the first and second liquids; an electrode layer formed on a surface, on the liquid room side, of one of the pair of base materials; and an insulating layer formed on a surface of the electrode layer; the electro-wetting device being characterized in that the insulating layer has a lamination structure of a first insulating film made of an insulating inorganic crystalline material, and a second insulating film made of an insulating inorganic amorphous material.

In addition, according to the embodiment, there is provided a method of manufacturing an electro-wetting device in which a conductive first liquid and an insulating second liquid are accommodated in a sealed liquid room without being immingled with each other, and an electrode layer is disposed on a part of an inner surface of the liquid room through an insulating layer, the method being characterized in that the insulating layer is formed through: a process for depositing a first insulating film made of an insulating inorganic crystalline material on the electrode layer; and a process for depositing a second insulating film made of an insulating inorganic amorphous material on the first insulating film.

In the embodiment, the insulating layer is structured in the form of the lamination structure of the insulating inorganic crystalline material, and the insulating inorganic amorphous material having higher surface flatness than that of the insulating inorganic crystalline material. As a result, it is possible to structure the inorganic insulating layer which is excellent in the surface flatness, and thus it is possible to obtain the insulating structure which is high in withstand voltage strength, and which is excellent in reliability. In addition, since the insulating layer having the high dielectric constant can be formed to have the small thickness, it is possible to reduce the drive voltage for the electro-wetting device.

In the embodiment, the first and second insulating films are made of oxides mutually containing therein the same metallic element. As a result, it is possible to structure the insulating layer which is excellent in adhesive property. Suitably, the materials of which the electrode layer and the insulating layer are intended to be made, respectively, are made so as to contain therein oxides of the same kind of metal, which results in that it is possible to improve the adhesive property between the electrode layer and the insulating layer. Specifically, for example, the electrode layer is made of AZO, the first insulating film is made of ZnO, and the second insulating film is made of ZnAlO.

These first and second insulating films can be formed by utilizing thin film forming means using vacuum, for example, a sputtering method. In this case, the insulating film made of a metal oxide film can be formed by utilizing the sputtering method in an oxygen ambient atmosphere in which a concentration is managed.

As set forth above, according to the embodiment, since it is possible to structure the insulating layer which has the high-dielectric constant, and which is excellent in surface flatness, it is possible to reduce the drive voltage for the electro-wetting device, and to improve the reliability of the electro-wetting device.

Additional features and advantages are described herein, and will be apparent from, the following Detailed Description and the figures.

DETAILED DESCRIPTION

Hereinafter, an embodiment will be described with reference to the drawings.

Figure 1:
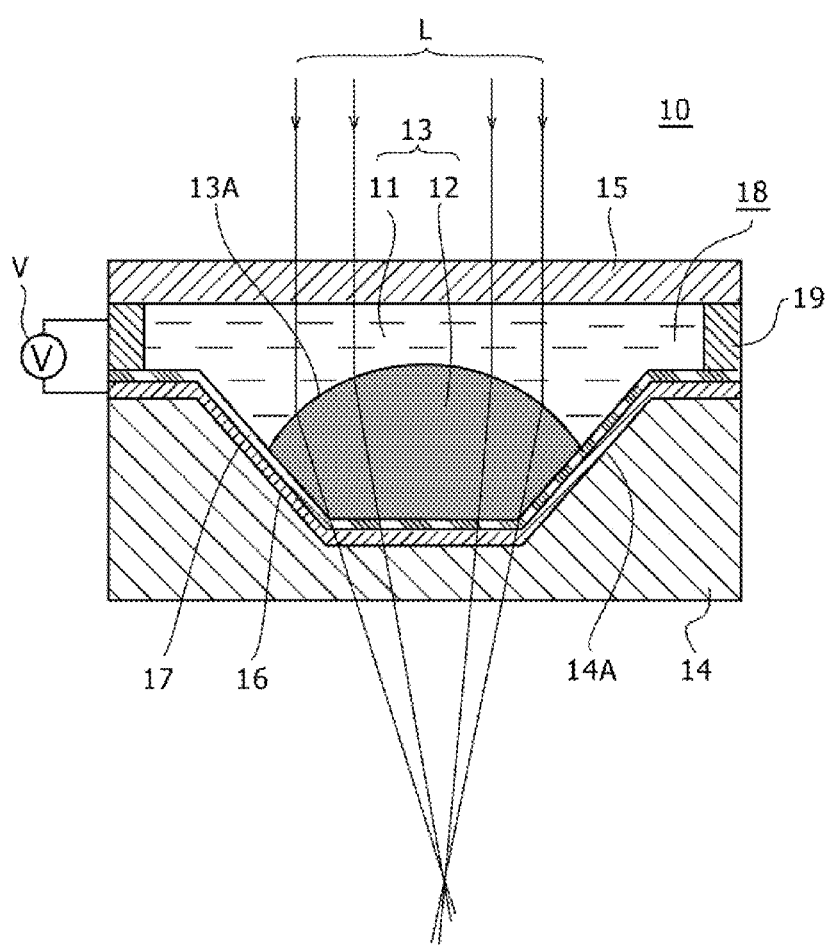
FIG. 1 A side cross-sectional view showing a schematic structure of an electro-wetting device according to an embodiment.

FIG. 1 is a side cross-sectional view showing a schematic structure of an electro-wetting device 10 according to an embodiment. In the electro-wetting device 10 of the embodiment, a conductive first liquid 11 and an insulating second liquid 12 are accommodated in an inside of a sealed liquid room 18. Also, the electro-wetting device 10 includes a lens element 13 having a lens surface formed by an interface 13A between the first liquid 11 and the second liquid 12. The electro-wetting device 10, for example, is used for an illumination optics, a flash unit of a camera, or the like, and is structured in the form of a variable focusing lens element for arbitrarily changing a focal length of a light L transmitted through the electro-wetting device 10.

A transparent liquid having a conductivity is used as the first liquid 11. For example, water, an electrolyte solution (a solution of an electrolyte such as potassium chloride, sodium chloride, or lithium chloride), an alcohol class such as methyl alcohol or ethyl alcohol having a small molecular weight, or a polar liquid such as an ambient temperature molten salt (ionic liquid) can be used as the first liquid 11.

A transparent liquid having an insulating property is used as the second liquid 12. For example, a hydrocarbon system material such as decane, dodecane, hexadecane or undecane, or a nonpolar solvent such as silicone oil or a fluorine system material can be used as the second liquid 12. In this embodiment, although a surface tension of the second liquid 12 which is smaller than a surface tension of the first liquid 11 is used, the embodiment is not limited thereto.

Materials which have refractive indices different from each other and which can exist without being immingled with each other are selected as the first and second liquids 11 and 12, respectively. Specifically, in this embodiment, a lithium chloride solution (concentration of 3.66 wt %, refractive index of 1.34) is used as the first liquid 11, and silicone oil (TSF437 made by GE Toshiba Silicone Co., Ltd., refractive index of 1.49) is used as the second liquid 12. In addition, the first and second liquids 11 and 12 preferably have specific gravities identical to each other. It is noted that the first and second liquids 11 and 12 may be colored as may be necessary.

Next, the liquid room 18 is defined inside of a container structured by sticking a transparent substrate 14 and a cover body 15 as a pair of base materials to each other.

The transparent substrate 14 and the cover body 15 are made of optical transparent insulating base materials, respectively. For example, the transparent substrate 14 and the cover body 15 are made of injection-molded bodies of plastic materials, glass materials, various kinds of ceramic materials, or the like. A transparent high-polymer material such as polycarbonate (PC), polyethylene terephthalate (PET), polyethylene naphthalate (PEN), polyether sulfone (PES) or polyolefin (PO) can be used as the plastic material.

In this embodiment, a recess portion 14A for accommodating therein the lens element 13 is formed on a surface portion, on the liquid room 18 side, of the transparent substrate 14. It is noted that the surface shape of the transparent substrate 14 can be arbitrarily formed, and thus may be formed as a flat surface without being limited to the example described above.

An electrode layer 16 is formed on a surface, on the liquid room 18 side, of the transparent substrate 14. The electrode layer 16 is made of a transparent electrode material. In this embodiment, the electrode layer 16 is formed from a sputtered film made of at least two or more kinds of metal oxides selected from the group containing therein Zn. Specifically, although the electrode layer 16 is formed from a sputtered film made of AZO ($ZnO-Al_2O_3$), the present invention is by no means limited thereto. For example, there is given an ITO (indium-tin oxide), GZO ($ZnO-Ga_2O_3$), SZO ($ZnO-SiO_2$), or the like.

Figure 2:
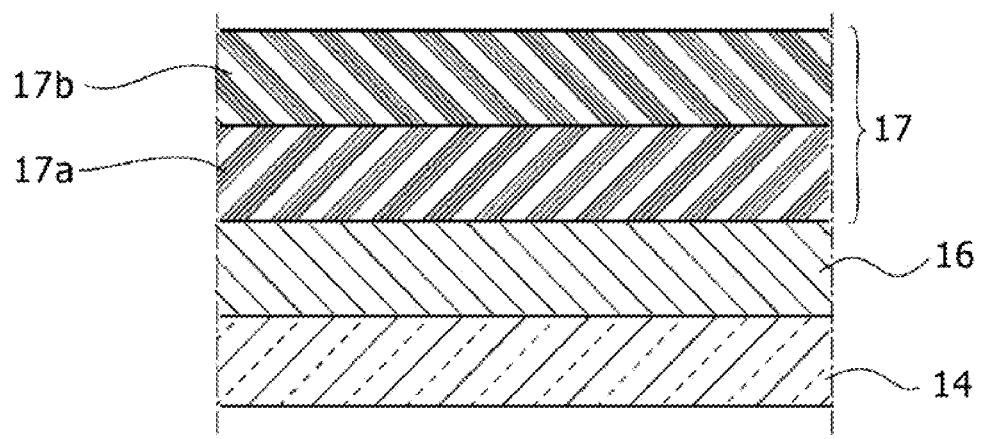
FIG. 2 A cross-sectional view schematically showing a structure of insulating layers of the electro-wetting device.

In addition, an insulating layer 17 according to the present embodiment is formed on the electrode layer 16. FIG. 2 is a cross-sectional view of the circumference of the electrode layer 16 showing a structure of the insulating layer 17. The insulating layer 17 has a lamination structure of a first insulating film 17a made of an insulating inorganic crystalline material, and formed on the electrode layer 16, and a second insulating film 17b made of an insulating inorganic amorphous material, and formed on the first insulating film 17a.

The first and second insulating films 17a and 17b are made of transparent oxides, respectively, which are formed by utilizing a vacuum thin film forming technique such as a sputtering method or a vacuum evaporation method. The first insulating film 17a is formed from a crystalline insulating film in itself, and the second insulating film 17b is formed from an amorphous insulating film in itself. The second insulating film 17b is provided for the purpose of absorbing irregularities of a surface of the crystalline first insulating film 17a.

For example, a high-dielectric constant film such as $ZnO$, $Al_2O_3$, $MgO$, $HfO_2$, $ZrO_2$, $Fe_2O_3$ or $TiO_2$ is suitably used as the first insulating film 17a. On the other hand, for example, $ZnAlO$, $SiO_2$, $SiN_x$ or the like is suitably used as the second insulating film 17b.

In this embodiment, the first insulating film 17a is made of $ZnO$, and the second insulating film 17b is made of $ZnAlO$. The first insulating film 17a and the second insulating film 17b are made of the oxides mutually containing therein the same metallic element, whereby an affinity between the first insulating film 17a and the second insulating film 17b is enhanced, thereby making it possible to improve an adhesive property. In addition, since the material (AZO) of which the electrode layer 16 is made contains therein the same metallic element as that of each of these insulating films 17a and 17b, the mutual adhesive property between the electrode layer 16 and the first insulating film 17a can be enhanced, and the promotion of the high-dielectric constant can be realized by enhancing a crystalline orientation property of the first insulating film 17a. It is noted that details of methods of forming the electrode layer 16 and the insulating layer 17 will be described later.

Although thicknesses of the first and second insulating films 17a and 17b are not especially limited, in this embodiment, the second insulating film 17b is formed to have the thickness equal to or smaller than that of the first insulating film 17a. The reason for this is because the first insulating film 17a is higher in dielectric constant than the second insulating film 17b due to its crystalline property, and thus dominantly determines the dielectric constant of the insulating layer 17. In addition, the reason for this is because it is enough for the second insulating film 17b to have such a thickness as to allow the surface flatness of the first insulating film 17a to be relaxed. It is noted that preferably, the surface of the insulating layer 17 has a water-repellent property. From such a viewpoint, the material of which the second insulating film 17b is intended to be made is selected, or a repellency treatment is performed for the surface of the second insulating film 17b.

The insulating layer 17 is formed over the entire area of formation area of the electrode layer 16, thereby preventing electrical short-circuit from being caused between the electrode layer 16 and the conductive first liquid 11. The insulating layer 17 faces the cover body 15 through an electrode member 19. The electrode member 19 is provided for application of a voltage from the outside of the liquid room 18 to the first liquid 11, and has a function of performing sealing between the transparent base material 14 and the cover body 15.

The electro-wetting device 10 of this embodiment structured in the manner as described above is provided with a voltage supply source V for applying a drive voltage across the electrode layer 16 and the electrode member 19 (the first liquid 11). A shape of an interface 13A between the first liquid 11 and the second liquid 12 is either spherical or aspherical, and its curvature changes depending on a magnitude of a drive voltage supplied from the voltage supply source V. Also, since the interface 13A composes a lens surface having a lens power corresponding to a difference in refractive index between the first liquid 11 and the second liquid 12, adjustment of the magnitude of the drive voltage results in that it is possible to change the focal length of the light L made incident from the cover body 15 side to the transparent substrate 14 side.

Figure 3:
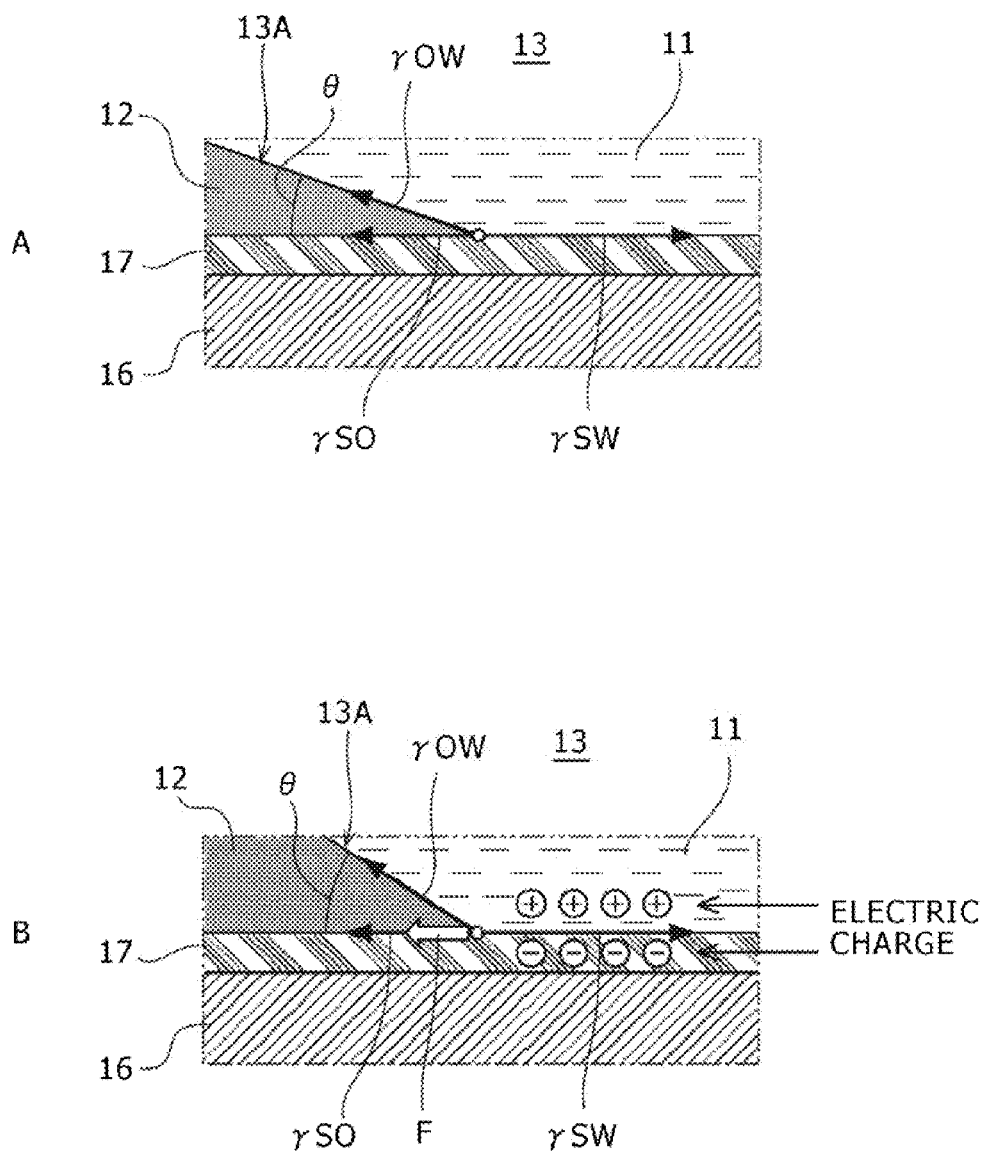
FIG. 3 Views explaining the principle of the electro-wetting effect.

FIGS. 3A and B show the principle of driving for the lens element 13. FIG. 3A shows states of tensions of interfaces between the insulating layer 17 and the first liquid 11, between the first liquid 11 and the second liquid 12, and between the second liquid 12 and the insulating layer 17 when no drive voltage is applied across the first liquid 11 and the electrode layer 16. Also, FIG. 3B shows the states of the tensions of the interfaces between the insulating layer 17 and the first liquid 11, between the first liquid 11 and the second liquid 12, and between the second liquid 12 and the insulating layer 17 when a predetermined drive voltage is applied across the first liquid 11 and the electrode layer 16.

Three interfacial tensions occur in the insulating layer 17/the first liquid 11/the second liquid 12 in the inside of the lens element 13. That is to say, the three interfacial tensions are a tension (SW) between the insulating layer 17 and the first liquid 11, a tension (OW) between the second liquid 12 and the first liquid 11, and a tension (SO) between the insulating layer 17 and the second liquid 12 which are represented herein by $\gamma sw$, $\gamma ow$ and $\gamma so$, respectively.

When no drive voltage is applied, the following relationship is established between the three interfacial tensions and a contact angle ($\theta$) between the insulating layer 17 and the second liquid 12 in accordance with a so-called Young-Laplace equation, and the shape of the interface 13A is determined based on the Young-Laplace equation:

$$\cos\theta = (\gamma sw - \gamma so)/\gamma ow$$

When the drive voltage is applied, the shape of the interface 13A is changed due to the electro-wetting effect. That is to say, electric charges are generated in the interface between the insulating layer 17 and the first liquid 11 by application of the drive voltage, whereby a pressure F expressed by following Expression is applied in the direction of the tension (SO) between the insulating layer 17 and the second liquid 12:

$$F = \frac{1}{2}(\epsilon \cdot \epsilon 0/d)V^2$$

(where $\epsilon$ represents a dielectric constant of an insulating layer, $\epsilon 0$ represents a dielectric constant of vacuum, d represents a thickness of the insulating layer, and V represents an applied voltage.)

Therefore, a relationship as expressed by following Expression is established between the three interfacial tensions, and the contact angle ($\theta$) between the insulating layer 17 and the second liquid 12. Thus, the contact angle $\theta$ increases as compared with the case where no voltage is applied, so that the shape of the interface 13A changes. In addition, the degree of the change can be controlled by changing the voltage:

$$\cos\theta = (\gamma sw - \gamma so)/\gamma ow - \frac{1}{2}(\epsilon \cdot \epsilon 0/d)V^2 \qquad (1)$$

As has been described, the shape of the interface 13A between the first and second liquids 11 and 12 having the refractive indices different from each other changes, thereby making it possible to change the focal length of the lens element 13. Also, the focal length can be controlled in accordance with the applied voltage.

On the other hand, from Expression (1), the shape of the interface 13A of the lens element 13 can be largely changed in spite of the same drive voltage (V) as the dielectric constant ($\epsilon$) of the insulating layer 17 is larger, or as the thickness of the insulating layer 17 is smaller. Therefore, for the purpose of reducing the drive voltage for the lens element 13, the dielectric constant of the insulating layer 17 needs to be made high or the thickness thereof needs to be made small.

Thus, since in the this embodiment, the insulating layer 17 (the first and second insulating films 17a and 17b) is made of the inorganic material, the larger dielectric constant can be obtained with the small thickness than in an organic system material such as polyparaxylene or PTFE (polytetrafluoroethylene). As a result, since the large change in shape can be caused in the lens element 13 with the low drive voltage, it is possible to reduce the drive voltage for the electro-wetting device 10.

In addition, according to this embodiment, since the insulating layer 17 is structured in the form of the lamination structure of the first insulating film 17a made of the inorganic crystalline material, and the second insulating film 17b made of the inorganic amorphous material, the surface roughness of the first insulating film 17a is covered by the second insulating film 17b, thereby making it possible to enhance the surface flatness of the insulating layer 17. As a result, the thickness of the insulating layer 17 can be unified, and the withstand voltage characteristics of the insulating layer 17 can be enhanced.

Figure 4:
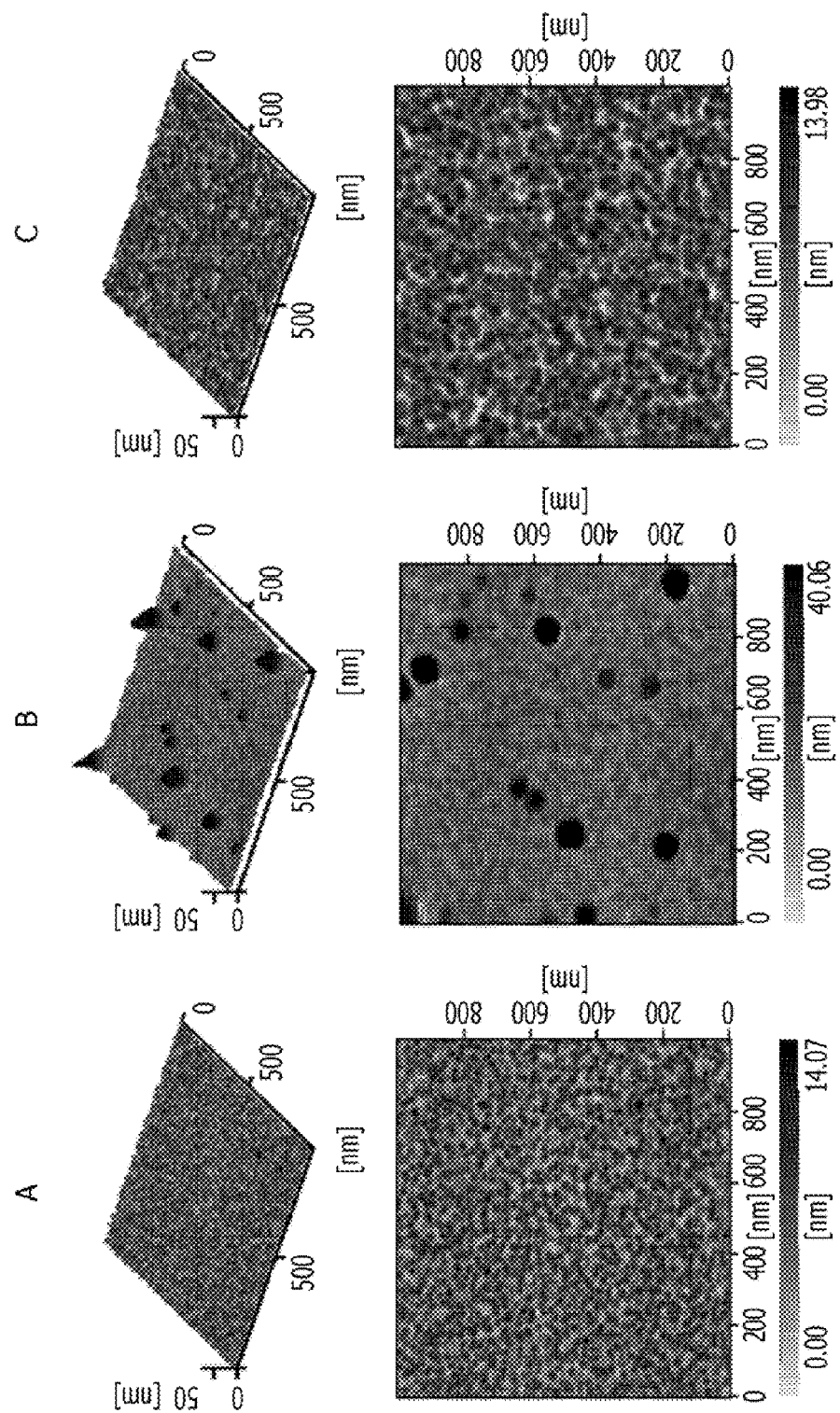
FIG. 4 Views showing results of observations of surfaces of an electrode layer and an insulating layer according to an example.

FIG. 4 shows an example of results of surface observations, for the layers of the electrode layer 16, the first insulating film 17a, and the second insulating film 17b, which were carried out by using a scanning probe microscopy ("SPA400" manufactured by SEIKO Instruments Co., Ltd.). Here, FIG. 4A shows the case where an AZO film was deposited as the electrode layer on a silicon substrate to have a thickness of 100 nm, and the surface roughness (Ra) was 1.7 nm. FIG. 4B shows a state in which a ZnO film was deposited as the first insulating film 17a on the AZO film to have a thickness of 50 nm, and the surface roughness (Ra) was 3.3 nm. FIG. 4C shows a state in which a ZnAlO film was formed as the second insulating film 17b on the ZnO film to have a thickness of 50 nm, and the surface roughness (Ra) was 1.7 nm.

As apparent from the results shown in FIG. 4, it is understood that the insulating layer is structured in the form of the lamination structure in which the amorphous insulating film (ZnAlO) is formed on the crystalline insulating film (ZnO), thereby enhancing the flatness of the surface of the insulating layer.

Figure 5:
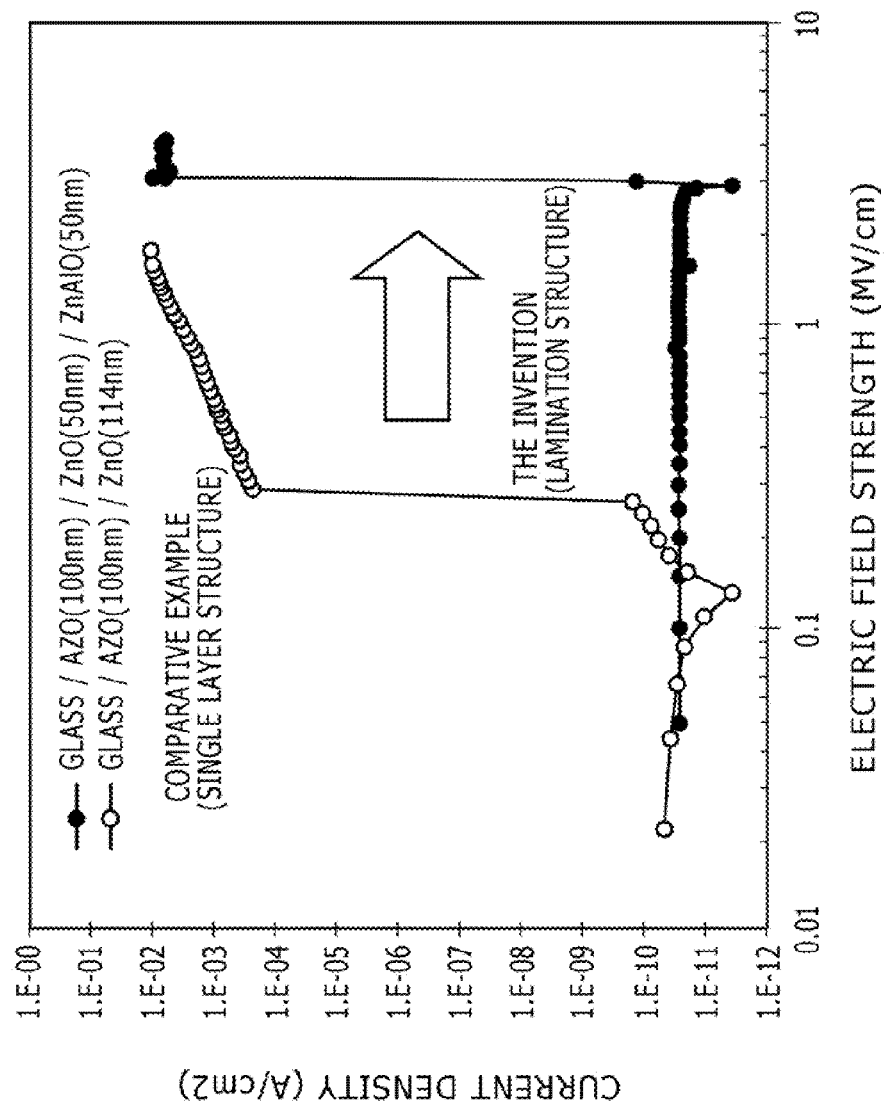
FIG. 5 A diagram showing a withstand voltage strength of the insulating layer according to an example.

In addition, FIG. 5 shows an experimental result obtained by comparing the withstand voltage characteristics of a sample having a single layer structure in which an insulating layer was made of only an inorganic crystalline material, and the withstand voltage characteristics of a sample having a lamination structure in which an inorganic amorphous material layer was formed on the inorganic crystalline material layer with each other. Here, a structure in which an AZO film was formed as an electrode layer on a glass substrate to have a thickness of 100 nm, and a ZnO film was formed as an inorganic crystalline material on the AZO film to have a thickness of 114 nm was used as the sample having the single layer structure. On the other hand, a structure in which an AZO film was formed as an electrode layer on a glass substrate to have a thickness of 100 nm, a ZnO film was formed as an inorganic crystalline material on the AZO film to have a thickness of 50 nm, and a ZnAlO film was formed as an inorganic amorphous material on the ZnO film to have a thickness of 50 nm was used as the sample having the lamination structure.

From the result shown in FIG. 5, a withstand voltage strength in the case of the sample having the single layer structure was 0.26 MV/cm, whereas a withstand voltage strength in the case of the sample having the lamination structure of the present invention was 3.05 MV/cm, and thus the remarkable improvement in the withstand voltage strength was recognized.

Next, a description will be given with respect to a method of forming the electrode layer 16 and the insulating layer 17 on the transparent substrate 14 in the electro-wetting device 10 of this embodiment.

Figure 6:
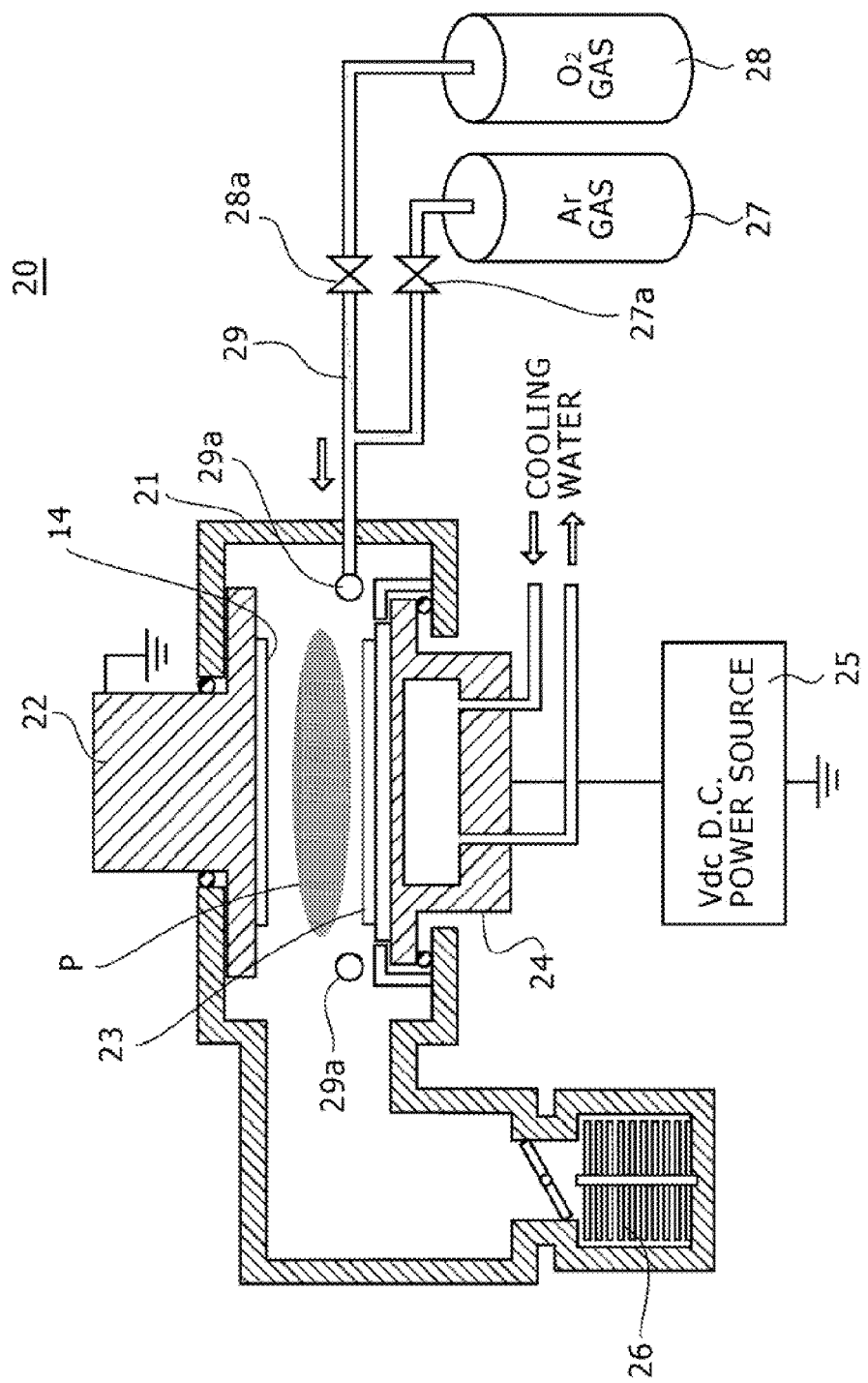
FIG. 6 A schematic diagram showing an example of a construction of a sputtering system used in manufacture of the electro-wetting device of the present invention.

The electrode layer 16 and the insulating layer 17 composing the electro-wetting device 10 in this embodiment are formed through continuous film deposition on the surface of the transparent substrate 14. The vacuum thin film forming technique such as a sputtering method or a vacuum evaporation method is used as the film deposition method for these electrode layer 16 and insulating layer 17. In particular, in this embodiment, the sputtering method is used. FIG. 6 shows an example of a construction of a sputtering system.

The sputtering system 20 shown in FIG. 6 is a D.C. sputtering system. A substrate holder 22 for holding a substrate (transparent substrate) 14, and a target holder 24 for holding a target 23 are disposed within a chamber 21 so as to face each other, and thus a voltage is adapted to be applied across the substrate 14 and the target 23. Specifically, the substrate 14 is grounded to the ground through the substrate holder 22, and the target 23 is connected to a D.C. power source 25 through the target holder 24. Thus, a predetermined minus voltage with respect to the earth potential of the substrate 14 is applied from the D.C. power source 25 to the target 23.

In addition, the sputtering system 20 has an air displacement pump 26 as an exhaust system within the chamber 21. Moreover, the sputtering system 20 has an Ar gas bomb 27, an $O_2$ gas bomb 28, and a gas piping 29 for mixing halfway gases from the gas bombs 27 and 28 with each other, and guiding the resulting mixed gas to the chamber 21 as a gas supply system. The mixed gas is controlled in respective flow ratios and flow rate for the mixing gas by an Ar gas flow rate controller 27a and an $O_2$ gas flow rate controller 28a both provided in the gas piping 29, and is guided to the chamber 21 through a process gas feed port 29a.

In depositing the electrode layer 16 on the substrate 14 by using the sputtering system 20, firstly, the substrate 14 is set in the substrate holder 22, and the target 23 is set in the target holder 24. Here, the target 23 is selected based on a material of which the electrode layer 16 is intended to be made. In this embodiment, a target (AZO target) in which $Al_2O_3$ is contained in ZnO is used. An $Al_2O_3$ content in the target 23 is preferably equal to or less than 10 wt %.

Next, the chamber 21 is evacuated by using the air displacement pump 26. Also, the mixed gas obtained by mixing predetermined amounts of $O_2$ gas and Ar gas as the reactive gases with each other is introduced to the chamber 21 through the process gas feed port 29a while a predetermined degree of vacuum (for example, in the range of 0.1 to 1 Pa) is maintained. Here, a ratio of flow rates (sccm) of the mixed gas (reactive gas flow ratio ($O_2/Ar$)) is adjusted so that the deposited transparent film has the conductivity so as for its resistance value to be equal to or smaller than a predetermined value (for example, 0.2% in the case of the AZO target). Or, no $O_2$ gas may be introduced to the chamber 21, and only an Ar gas may be introduced to the chamber 21.

Next, a D.C. voltage is applied across the target 23 and the substrate 14 by the D.C. power source 25, so that glow discharge is caused with an ambient gas ($O_2$+Ar, or Ar) to form plasma P. An electric power (for example, in the range of 0.1 to 7.8 W/cm$^2$) is supplied from the D.C. power source 25 to start the sputtering, thereby forming the electrode layer 16 based on a target composition on the substrate 14.

In the manner as described above, the transparent electrode layer 16 is formed on the substrate 14. Subsequently, the insulating film 17 is deposited on the electrode layer 16. The film deposition of the insulating layer 17 is carried out through a process for depositing the first insulating film 17a, and a process for depositing the second insulating film 17b. The film deposition of these first and second insulating films 17a and 17b is carried out by using the same sputtering system as the sputtering system 20 shown in FIG. 6.

In this case, a Zn metallic target is used as the target 23 for the film deposition of the first insulating film 17a, and an oxygen gas flow ratio ($O_2/(O_2+Ar)$) of the process gas, for example, is adjusted so as to be equal to or larger than 40%. The first insulating film 17a formed from the crystalline ZnO film is deposited on the electrode layer 16 through the reactive sputtering described above.

On the other hand, an alloy target obtained by doping Zn with Al is used as the target 23 for the film deposition of the second insulating film 17b, and an oxygen gas flow ratio ($O_2/(O_2+Ar)$) of the process gas, for example, is adjusted so as to be equal to or larger than 40%. The second insulating film 17b formed from the amorphous AlZnO film is deposited on the first insulating film 17a through the reactive sputtering described above.

It is noted that although in the case of the example described above, the process for depositing the first insulating film 17a, and the process for depositing the second insulating film 17b are carried out in different chambers, respectively, in this case, a vacuum system in which a substrate can be carried without destroying the vacuum ambient atmosphere is suitably used. The vacuum system is typified by an in-line continuous sputtering system having a plurality of sputtering rooms disposed adjacent to one another, a single-wafer vacuum processing system having a plurality of vacuum processing rooms disposed in a cluster-like shape, or the like. In addition, it is also possible to adopt a method in which a plurality of targets are disposed within the same chamber, and the targets are used appropriately in accordance with the film depositing process.

In the manner described above, the electrode layer, and the insulating layer 17 composed of the lamination structure of the first and second insulating films 17a and 17b are deposited in order on the transparent substrate 14. According to the method of manufacturing the electro-wetting device of this embodiment, since it is possible to form the high-dielectric constant insulating layer which is excellent in the surface flatness, it is possible to stably manufacture the low-voltage driven electro-wetting device having the high reliability.

Although in the above embodiment, the description has been given by giving the electro-wetting device including the single lens element as an example, the embodiment can also be applied to an insulating layer structure of an electro-wetting device having a plurality of lens elements each described above disposed in array.

In addition, the embodiment can be applied not only to the electro-wetting device for the application of the variable focusing lens, but also to an electro-wetting device for other optical applications such as light distribution control, or for applications of various actuators such as a stage unit for positioning and carrying a work by utilizing a change in surface tension of a liquid.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An electro-wetting device comprising:
a conductive first liquid;
an insulating second liquid;
a pair of base materials defining a liquid room for accommodating therein the first and second liquids;
an electrode layer formed on a surface, on a liquid room side, of one of said pair of base materials; and
an insulating layer formed on a surface of said electrode layer;
wherein said insulating layer has a lamination structure of a first insulating film made of an insulating inorganic crystalline material, and a second insulating film made of an insulating inorganic amorphous material wherein said first and second insulating films are made of oxides mutually containing therein the same metallic element, respectively.

2. An electro-wetting device comprising:
a conductive first liquid;
an insulating second liquid;
a pair of base materials defining a liquid room for accommodating therein the first and second liquids;
an electrode layer formed on a surface, on a liquid room side, of one of said pair of base materials; and
an insulating layer formed on a surface of said electrode layer;
wherein said insulating layer has a lamination structure of a first insulating film made of an insulating inorganic crystalline material, and a second insulating film made of an insulating inorganic amorphous material, wherein said electrode layer, and said first and second insulating films are made of transparent oxides mutually containing the same metallic element, respectively.

3. A method of manufacturing an electro-wetting device comprising: providing a conductive first liquid and an insulating second liquid accommodated in a sealed liquid room without being immingled with each other; forming an electrode layer disposed on a part of an inner surface of said liquid room and underneath an insulating layer; and
forming the insulating layer through:
a process for depositing a first insulating film made of an insulating inorganic crystalline material on said electrode layer, and
a process for depositing a second insulating film made of an insulating inorganic amorphous material on said first insulating film, wherein a Zn metallic target is used for the film deposition of said first insulating film, and a Zn-Al alloy target is used for the film deposition of said second insulating film.

4. The method of manufacturing the electro-wetting device according to claim 3, wherein film deposition of said first and second insulating films is carried out by utilizing a sputtering method in an oxygen gas ambient atmosphere.

* * * * *